Patented Nov. 29, 1932

1,889,710

UNITED STATES PATENT OFFICE

SVEND S. SVENDSEN, OF CHICAGO, ILLINOIS, ASSIGNOR TO CLAY REDUCTION COMPANY, A CORPORATION OF ILLINOIS

PROCESS FOR MAKING METALLIC SULPHATES

No Drawing.    Application filed February 5, 1930. Serial No. 426,183.

This invention relates to the production of metallic sulphates from silicious oxygen compounds containing metallic oxides, such as talc, beryl, lepidolite, leucite, and clays such as fire clay, diaspore, kaolin, and bauxites. It relates especially to the production of aluminum sulphate from such clays.

In my prior and copending applications Serial No. 304,617 filed September 7, 1928, of which this application is a division in part, and Serial No. 425,672 filed February 3, 1930, I have described and claimed a process for treating silicious and titaniferous compounds containing metallic oxides wherein the compounds are treated with ammonium fluoride and the mixture heated to produce and volatilize ammonia-silicon-fluorine compounds, leaving metallic compounds to be worked up into other valuable products.

In accordance with the present invention, minerals containing a metallic oxide and silica are mixed and heated with ammonium fluoride or bifluoride, or substances which yield the same under the conditions of the reaction, and all or a substantial part of the silica is thereby volatilized. The metallic oxide or other metallic compound is converted into a sulphate by the action of a reactive sulphate.

Compounds containing titania or both silica and titania react similarly, the behavior of the titania resembling that of slilica.

By the term "reactive sulphate" I intend to designate one which under the conditions of the reaction parts with its sulphuric acid ($SO_4$) radical to form a metallic sulphate during the reaction. In this application sulphuric acid, ammonium sulphate, and ammonium bisulphate are regarded as reactive sulphates, as will become apparent as the process is further explained.

By the term "ammonium fluoride" I intend to designate the normal fluoride and the bifluoride as well as substances or mixtures thereof which yield ammonium fluoride under the conditions of the reaction, such as mixtures of metallic fluorides and ammonium sulphate.

Metallic fluorides, ammonium silico-fluoride, silicon diammino tetrafluoride, ammonia, and water are formed when ammonium fluoride is heated to above about 230° C. with silicious oxygen compounds containing metallic oxides, either free and/or combined with the silica. In accordance with the present invention, such metallic fluorides as are formed together with any remainder of the metallic oxygen compounds are decomposed by the action of a reactive sulphate added in a quantity sufficient to convert these metallic compounds into sulphate. Where ammonium sulphate or bisulphate is used the amount is preferably so proportioned that no ammonium salt is left in the residue.

The reactions are illustrated by the following schematic contracted equations using kaolin for the production of aluminum sulphate:

(1) $Al_2O_3.2SiO_2 + 8NH_4F + 3H_2SO_4 =$
$Al_2(SO_4)_3 + 2SiF_4.2NH_3 + 4NH_3 + 7H_2O$ (2) $Al_2O_3.2SiO_2 + 8NH_4F + 3(NH_4)_2SO_4 =$
$Al_2(SO_4)_3 + 2SiF_4.2NH_3 + 10NH_3 + 7H_2O$

A reactive sulphate alone attacks the metallic oxide of a silicious oxygen compound containing such an oxide more or less incompletely, according to the nature of the compound. However, a reactive sulphate, acting either simultaneously with ammonium fluoride or after the ammonium fluoride has reacted with the silicon of the silicious compound, substantially completely decomposes the silicious compound and especially such compounds that have a substantial silica content, the silica being largely or completely volatilized as silicon diammino tetrafluoride and the other metallic compounds being substantially completely sulphated. Any excess ammonium fluoride forms volatile fluorine compounds. However, an excess of ammonium fluoride may be used advantageously with compounds low in silica such as high grade bauxites. I have found that with low silica compounds an excess of fluoride over that needed to combine with the silica helps the sulphating reaction, so that substantially all of the metallic oxide is converted into sulphate.

If the reactive sulphate is sulphuric acid it is preferably added after the silicon diammino tetrafluoride is volatilized.

The minimum temperature needed to convert into sulphates such metallic fluorides as are formed in the first reaction is about 280° to 330° C. when a silicious compound is present. Higher temperatures may be used. However, reduction of sulphuric acid to sulphurous acid by organic matter which may be present in the raw material starts above 330° C. Above 350° C. ammonia starts to act as a reducing agent. At about 400° C. silicon diammino tetrafluoride starts to decompose into hydrogen fluoride and a silicon nitrogen compound. For these reasons the temperature should preferably not exceed 350° C. until all ammonium compounds are volatilized.

Although the ammonium fluoride may be added to the silicious compound in water solution and the water evaporated therefrom it is preferably added gradually in dry form to the raw material maintained above 100° C. in which case the water formed in the process is evolved as a vapor. Caking of the charge by condensation of water evolved in the process is thereby prevented. The ammonium fluoride also may be supplied as a vapor.

In the following example one method of operating the process is described, clay being used for the raw material and sulphuric acid as the reactive sulphate.

The clay, calcined at between 600° and 900° C., and preferably between 650° and 800° C. to make it more reactive, and pulverized to about 100 mesh or finer, is heated to between 100° and 200° C. in an exteriorly heated furnace (a multiple-hearth muffle type furnace is well suited for this purpose), supplied with a stirring arrangement. Ammonium fluoride is gradually added in a quantity sufficient to materially convert the silicon present in the raw material into silicon diammino tetrafluoride. The same temperature is maintained in the charge with stirring. The vapors evolved, principally consisting of ammonia and steam, are collected. Keeping the temperature below 200° C. during the addition of fluoride prevents any substantial volatilization of ammonium fluoride.

After the ammonium fluoride is added the temperature is raised, preferably to between 230° and 350° C., to volatilize silicon diammino tetrafluoride, the charge being stirred constantly to prevent local over-heating. When silicon fluoride ammonia is no longer evolved, sulphuric acid, 60° Bé. acid being suitable, is added gradually with constant stirring. The heating is continued until the evolution of the silicon compound ceases, the reaction then being complete. Silicon fluoride, which is formed by the action of the acid, may be combined with ammonia, preferably ammonia generated by the reaction of the ammonium fluoride on the silicious compound, to form silicon fluoride ammonia.

When a multiple hearth furnace is used the vapors from the different steps in the operation are automatically mixed. They are preferably purified from solids which they may carry over in a suitable fume collector, such as a Cottrell precipitator. The silicon diammino tetrafluoride is prevented from condensing by keeping the vapors at a temperature above 230° C. The vapors may then be cooled in a condensing or precipitation chamber to a temperature between 100° and 230° C., whereby the silicon diammino tetrafluoride is condensed and the sublimate collected. The ammonia and water vapors pass through and are collected by condensation, the tail gases being treated in a sulphuric acid scrubber. Preferably, however, the combined vapors are subjected to the action of water to decompose the silicon diammino tetrafluoride into precipitated hydrated silica and ammonium fluoride, which may be recovered and again used in the process. At below 34° C. this reaction is complete. The reaction may be indicated as follows:

(3) 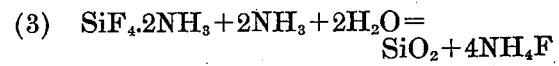
$$SiF_4.2NH_3 + 2NH_3 + 2H_2O = SiO_2 + 4NH_4F$$

The sulphate residue from the furnace may be treated for the recovery of valuable metallic sulphates. From clay and bauxite, aluminum sulphates may be recovered. From talc, magnesium sulphate may be recovered.

In the above specific example, ammonium fluoride was used. A mixture of ammonium sulphate and calcium fluoride (fluorspar) or other fluoride may be substituted. The conditions of reaction are modified somewhat, since ammonium sulphate and calcium fluoride do not react to form ammonium fluoride until a temperature of about 350° C. is reached. However, the presence of reactive silicious compounds depresses the starting reaction temperature to around 280° C. to 330° C., so that silicon diammino tetrafluoride is formed below 330° C. Other reactive metal fluorides, such as sodium fluoride, may be used. The calcium or other metal sulphate formed in the reaction between the ammonium sulphate and metallic fluoride remains as a metallic sulphate in the reaction chamber. The following is a specific example of this method using bauxite as the silicious material and fluorspar as the source of fluorine.

The pulverized bauxite, calcined at between about 375° C. to 600° C., preferably between 400° C. and 500° C., is mixed with fluorspar and ammonium sulfate in the proportions required by the following schematic equations:

(4) $CaF_2 + (NH_4)_2SO_4 = 2NH_4F + CaSO_4$ (5) 
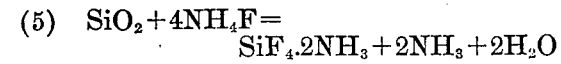
$$SiO_2 + 4NH_4F = SiF_4.2NH_3 + 2NH_3 + 2H_2O$$

The reaction mixture is heated at about

280° to 350° C. until all of the silicon diammino tetrafluoride, ammonia and water vapor are evolved.

An additional amount of ammonium sulphate in the proportions of Equation No. 2 is caused to react with the reaction mixture. This ammonium sulphate may have been added simultaneously with that added to decompose the fluorspar or it may be added after the silicon fluoride ammonia has been volatilized. The evolved vapors consisting of ammonia, water, and silicon diammino tetrafluoride are treated as previously described. Titania present in the bauxite is volatilized as titanium fluoride ammonia compounds when sufficient fluoride has been added. The residue in the furnace consists principally of aluminium and calcium sulphates. The aluminum is dissolved in water. It may be further purified after dissolving by settling and decantation, or by filtering.

Where the mineral treated contains iron, it is preferably reduced to the ferrous state to avoid the production of ferric alum and also to prevent loss of ammonia during the reaction. This reduction may suitably be effected by passing a reducing gas such as carbon monoxide, hydrogen or gases containing them through the finely divided mineral at temperatures of the order of 400° C. In many cases there is sufficient organic matter in the mineral so that the reduction can be effected by mere heating in an inert atmosphere such as steam. Where iron is present, it is preferred to avoid any excess of sulphate or to use somewhat less than theoretically required to convert the alumina and alkali metal compounds into sulphates. In this way most of the iron in the residue is in the form of insoluble compounds.

From the impure aluminum sulphate solution iron salts may be eliminated as prussiates by treating with a ferrocyanide solution, as is well known to those skilled in the art. I have discovered, however, that it is possible to form valuable and easily filtered prussiate silica lakes with the prussiate formed by depositing it on the precipitated hydrated silica. This may be formed by decomposing the silicon diammino tetrafluoride with water and ammonia as previously described. To secure the best results the freshly precipitated washed silica is added to the impure sulphate and thoroughly agitated therein before the addition of the ferrocyanide.

The iron may also be eliminated by heating the reaction mixture, after completion of the reaction and volatilization of the ammonium compounds, to a temperature of at least 400° C., and preferably somewhat higher. The iron is thereby converted into insoluble compounds and does not pass into solution on leaching out the aluminum sulphate, even with an acid solution.

By my improved method it is possible to make directly from kaolin or other clay materials, without purifying operations, a commercial aluminum sulphate low in iron, alkali, or other sulphate forming metallic oxide impurities. The kaolin or other suitable clay, after calcining as previously described is subjected to the action of ammonium fluoride followed by sulphuric acid (Equation No. 1) or ammonium sulphate (see Equation No. 2). The resulting product is a white powdery, anhydrous, aluminum sulphate containing small amounts of unattacked mineral. This crude aluminum sulphate may be handled and shipped readily at a considerable freight saving since the ordinary commercial aluminum sulphate contains nearly 50 per cent of water. It may be dissolved readily in water.

If titanium or vanadium compounds are present in the silicious oxygen compounds, as in most clays and bauxites, the titanium reacts with the ammonium fluoride in a manner analogous to the silicon reaction; that is, titanium or vanadium fluoride ammonia compounds are formed. These pass over with the silicon diammino tetrafluoride and may be decomposed by water and ammonia to form vanadium oxide or titania and ammonium fluoride. Titanium and silicon are adjacent members in Group IV of the Periodic Table and have similar properties in connection with the reactions involved herein.

I claim:

1. The method of sulphating the metallic oxide of a silicious oxygen compound containing such oxide which comprises reacting on said compound with ammonium fluoride, heating to form and volatilize silicon diammino tetrafluoride therefrom, thereby volatilizing any water present, and heating the residue with a reactive sulphate in a quantity not greater than that needed to sulphate completely said metallic oxide.

2. The method of sulphating the metallic oxide of a silicious oxygen compound containing such oxide which comprises mixing said compound with a metallic fluoride and ammonium sulphate, heating to form and volatilize silicon diammino tetrafluoride therefrom, thereby volatilizing any water present, and heating the residue with a reactive sulphate in a quantity not greater than that needed to sulphate completely said metallic oxide.

3. The method of making aluminum sulphate from a clay which comprises mixing said clay with fluorspar and ammonium sulphate, heating to form and volatilize silicon diammino tetrafluoride therefrom, thereby volatilizing any water present, and heating the residue with a reactive sulphate in a quantity not greater than that needed to sulphate the aluminum of the clay.

4. The method of making a metallic sulphate from a silicious oxygen compound containing metallic oxide which comprises mixing said compound with ammonium fluoride, heating to form and volatilize silicon diammino tetrafluoride therefrom, thereby volatilizing any water present, and heating the residue with sulphuric acid.

5. The method of making a metallic sulphate from a silicious oxygen compound containing metallic oxide which comprises mixing said compound with ammonium fluoride, heating at above about 230° C. to form and volatilize silicon diammino tetrafluoride therefrom, thereby volatilizing any water present, and heating the residue with sulphuric acid in such proportions as to substantially form the normal sulphate with the metallic oxide.

6. The method of making a metallic sulphate from a silicious oxygen compound containing metallic oxide which comprises mixing said compound with ammonium fluoride in a quantity to substantially convert silicon present to silicon diammino tetrafluoride, heating to form and volatilize silicon diammino tetrafluoride therefrom, thereby volatilizing any water present, and heating the residue with sulphuric acid in such proportions and at such temperature as to substantially form the normal sulphate with the metallic oxide and any metallic fluoride formed during the reaction with said ammonium fluoride.

7. The method of making a metallic sulphate from a silicious oxygen compound containing metallic oxide which comprises mixing said compound with ammonium fluoride in a quantity to substantially convert silicon present to silicon diammino tetrafluoride, heating at above about 230° C. to form and volatilize silicon diammino tetrafluoride therefrom, thereby volatilizing any water present, and heating the residue with sulphuric acid at about 230° C. to 350° C. to form sulphates with the metallic oxide and any metallic fluoride formed during the reactions with said ammonium fluoride.

8. The method of making aluminum sulphate from a silicious oxygen compound containing aluminum oxide which comprises mixing said compound with ammonium fluoride, heating the mixture to above about 230° C. to form and volatilize silicon diammino tetrafluoride therefrom, thereby volatilizing any water present, and heating the residue with a reactive sulphate.

9. The method of making aluminum sulphate from a silicious oxygen compound containing aluminum oxide which comprises mixing said compound with ammonium fluoride, heating the mixture to above about 230° C. to form and volatilize silicon diammino tetrafluoride therefrom, thereby volatilizing any water present, and heating the residue with sulphuric acid.

10. The method of making aluminum sulphate from a silicious oxygen compound containing aluminum oxide which comprises mixing said compound with ammonium fluoride at above 100° C., heating at above about 230° C. to form and volatilize silicon diammino tetrafluoride therefrom, thereby volatilizing any water present, and heating the residue with sulphuric acid in such proportions as to form substantially aluminum sulphate.

11. The method of making aluminum sulphate solution from a silicious oxygen compound containing aluminum oxide which comprises reacting said compound with ammonium fluoride, heating to form and volatilize silicon diammino tetrafluoride therefrom, thereby volatilizing any water present, heating the residue with sulphuric acid to form aluminum sulphate, adding water to the sulphated reaction mass to dissolve the aluminum sulphate, and filtering the resulting solution.

12. The method of making aluminum sulphate solution from a silicious oxygen compound containing aluminum oxide which comprises reacting said compound with ammonium fluoride, heating to form and volatilize silicon diammino tetrafluoride therefrom, thereby volatilizing any water present, heating the residue with sulphuric acid to form aluminum sulphate, and heating the reaction mass with the water needed to dissolve the anhydrous sulphate and to enable the resulting solution to solidify by crystallization on cooling.

13. The method of making substantially iron-free aluminum sulphate from a silicious oxygen compound containing aluminum oxide which comprises reacting said compound with ammonium fluoride, heating to form and volatilize silicon diammino tetrafluoride therefrom, heating the residue with sulphuric acid in such proportions as to form substantially aluminum sulphate, adding water to the sulphated reaction mass to dissolve the aluminum sulphate, filtering the resulting solution, precipitating the iron by means of a ferrocyanide on to a precipitated hydrated silica, and filtering the resultant prussiate silica lake from said solution.

14. The method of making a metallic sulphate from a silicious oxygen compound containing metallic oxide which comprises calcining said compound at a suitable temperature to make it more reactive, reacting said calcined compound with ammonium fluoride, heating to form and volatilize silicon diammino tetrafluoride therefrom, thereby volatilizing any water present, and heating the residue with sulphuric acid.

15. The method of making aluminum sulphate from a clay which comprises calcining said clay at from about 375° to 900° C., reacting with ammonium fluoride, heating to form and volatilize silicon diammino tetrafluoride therefrom, thereby volatilizing any water present, and heating the residue with sulphuric acid.

16. The method of making aluminum sulphate from a bauxitic clay which comprises calcining said bauxitic clay at from about 375° C. to 600° C., reacting with ammonium fluoride, heating to form and volatilize silicon diammino tetrafluoride therefrom, thereby volatilizing any water present, and heating the residue with sulphuric acid.

17. The method of making aluminum sulphate from bauxitic clay low in silica, which comprises calcining said bauxitic clay at about 375° C. to 600° C., heating with excess ammonium fluoride to form and volatilize silicon diammino tetrafluoride therefrom, thereby volatilizing any water present, and heating the residue with sulphuric acid.

18. The method of making a metallic sulphate from a silicious oxygen compound containing metallic oxide which comprises mixing and heating said compound with a metallic fluoride and ammonium sulphate at about 280° C. to 350° C., to form and volatilize silicon diammino tetrafluoride therefrom, thereby volatilizing any water present, and heating the residue with sulphuric acid.

19. The method of making aluminum sulphate from a silicious oxygen compound containing aluminum oxide, which comprises mixing and heating said compound with fluorspar and ammonium sulphate at about 280° C. to 350° C. to form and volatilize silicon diammino tetrafluoride therefrom, thereby volatilizing any water present, and heating the residue with sulphuric acid.

20. The method of decomposing a silicious oxygen compound containing a metallic oxide and sulphating said metallic oxide, which comprises reacting upon said compound in dry state with at least sufficient ammonium fluoride to form silicon-fluorine ammonia compounds with substantially all of the silicon in said compound, and reacting on the residual metallic compounds with a reactive sulphate.

21. The method for decomposing a silicious oxygen compound containing oxide of aluminum and sulphating said aluminum oxide, which comprises reacting upon said compound in dry state with at least sufficient ammonium fluoride to form silicon diammino tetrafluoride with substantially all of the silicon in said compound, volatilizing said silicon diammino tetrafluoride from the reaction mass, and reacting upon the residual mass with a reactive sulphate.

22. The method for decomposing a silicious oxygen compound containing oxide of aluminum and sulphating said aluminum oxide substantially completely, which comprises reacting upon said compound in dry state with an excess of ammonium fluoride, volatilizing the silicon diammino tetrafluoride formed from the reaction mass, and reacting upon the residual mass with a reactive sulphate.

23. The method of making sulfates from a silicious oxygen compound containing oxides and including iron which comprises subjecting such a compound to reduction to reduce ferric impurities to the ferrous state, mixing the compound with ammonium fluoride, heating the mixture to form and volatilize silicon diammino tetrafluoride therefrom, and heating the residue with sulfuric acid.

24. The method of making a metallic sulphate from a silicious oxygen compound containing metallic oxides and including iron which comprises subjecting such a compound to reduction to reduce ferric impurities to the ferrous state, mixing the compound with ammonium fluoride, heating the mixture to form and volatilize silicon diammino tetrafluoride therefrom, and heating the residue with sulphuric acid.

25. The method of making sulphates from a silicious oxygen compound containing oxides and including iron which comprises mixing such a compound with ammonium fluoride, heating the mixture to form and volatilize silicon diammino tetrafluoride therefrom, heating the residue with a reactive sulphate, further heating the sulphated product to convert iron impurities to an insoluble state, and leaching out the soluble sulphates.

In testimony whereof I have hereunto set my hand and seal this 30th day of January, 1930.

SVEND S. SVENDSEN.

CERTIFICATE OF CORRECTION.

Patent No. 1,889,710.                                                                  November 29, 1932.

SVEND S. SVENDSEN.

It is hereby certified that error appears in the printed specification of the above numbered patent requiring correction as follows: Page 1, line 61, for "sulphate" read "sulphates"; page 2, line 65, for "fluoride ammonia" read "diammino tetrafluoride"; and that the said Letters Patent should be read with these corrections therein that the same may conform to the record of the case in the Patent Office.

Signed and sealed this 10th day of January A. D. 1933.

(Seal)                                                           M. J. Moore,
Acting Commissioner of Patents.